United States Patent [19]

Merola et al.

[11] 4,288,858

[45] Sep. 8, 1981

[54] INVERSE TWO-DIMENSIONAL TRANSFORM PROCESSOR

[75] Inventors: Pasquale A. Merola, Brookfield, Wis.; Marshall K. Quick, Whitesboro, N.Y.

[73] Assignee: General Electric Company, Utica, N.Y.

[21] Appl. No.: 80,643

[22] Filed: Oct. 1, 1979

[51] Int. Cl.³ .................. G06G 7/22; G06F 15/34
[52] U.S. Cl. ................................ 364/826; 364/725
[58] Field of Search ......................... 364/826, 725

[56] References Cited

U.S. PATENT DOCUMENTS

| | | | |
|---|---|---|---|
| 3,277,449 | 10/1966 | Shooman | 364/200 |
| 3,413,611 | 11/1968 | Pfuetze | 364/900 |
| 3,438,003 | 4/1969 | Bryan | 364/900 |
| 3,509,542 | 4/1970 | Ehrman | 364/900 |
| 3,535,694 | 10/1970 | Anacker et al. | 364/900 |
| 3,775,753 | 11/1973 | Kastner | 364/900 |
| 3,920,974 | 11/1975 | Means | 364/725 |
| 3,971,927 | 7/1976 | Speiser et al. | 364/826 |
| 4,092,725 | 5/1978 | Hershman | 364/826 |
| 4,152,772 | 5/1979 | Speiser et al. | 364/725 |

Primary Examiner—David H. Malzahn
Attorney, Agent, or Firm—Ralph M. Savage

[57] ABSTRACT

A processor capable of performing a two-dimensional inverse transform on high speed analog data and outputting the results in a display compatible format. The processor utilizes two charge coupled devices (CCD's), two matrix multipliers, which each perform a one-dimensional transform. The one-dimensional transformed data is multiplexed into a series to parallel converter so that another matrix multiplier can complete the two-dimensional transformation of the analog data.

4 Claims, 7 Drawing Figures

INVERSE TWO-DIMENSIONAL TRANSFORM PROCESSOR

BACKGROUND OF THE INVENTION

1. Field Of The Invention

This invention relates generally to any processing system requiring an inverse two-dimensional transformation of source data, and more specifically to video bandwidth compression systems which use transform and coding techniques to minimize the number of coding symbols required to describe an image.

2. Description Of Prior Art

Two dimensional inverse transforms are ordinarily generated using Fast Fourier Transform (FFT) algorithms, or variations thereof, implemented using either a digital computer or a special purpose processor. Both methods suffer severe limitations in that the signal processing power required to perform two-dimensional inverse transforms in real-time results in a hardware realization which is generally inconsistent with the size, weight, power and cost requirements of many airborne transform decoder applications. This is particularly true in the case of the inverse discrete cosine transform, which is the preferred transform for video bandwidth compression systems, in that in order to achieve the symmetry properties necessary to utilize "fast" algorithms, the size of the transform must be doubled. That is, in order to realize an N-point inverse cosine transform, a 2N-point processor must be implemented resulting in a significant increase in processor complexity.

Accordingly, it is an object of the present invention to provide a two-dimensional inverse transform processor which is organized to accept high speed sampled analog input data and to output the results in a fashion suitable for direct interface with a standard video display monitor.

A further objective is to reduce signal processing complexity, even in the case of the inverse cosine transform, by calculating only the N reconstructed video samples to be displayed on a given video line as opposed to the total $N \times N$ or $N^2$ samples ($2 N^2$ samples for the "fast" cosine transform).

Another object is to accomplish two-dimensional inverse transform processing at a fraction of the cost, size, weight and power required by other two-dimensional inverse transform techniques.

SUMMARY OF THE INVENTION

The foregoing objects are achieved according to this invention by circumventing the high data rate and storage requirements associated with performing two-dimensional inverse transformations by prior art techniques. The processor utilizes a charged coupled device (CCD), a matrix multiplier chip, to allow data to be processed directly and efficiently. In contrast to the conventional "fast" algorithm techniques, the proposed approach is based on a direct implementation of discrete transforms via a processor organization capable of calculating only those reconstructed pixel values of interest during any video line.

BRIEF DESCRIPTION OF THE DRAWINGS

Various other objects, features and attendant advantages of the present invention will be more fully appreciated from the following detailed description in connection with the accompanied drawings.

DESCRIPTION OF THE PREFERRED EMBODIMENT

The two dimensional transform processor uniquely circumvents the high data rate and storage requirements associated with performing two dimensional transforms. The processor is capable of performing its processing efficiently with a here-to-fore unknown application of a matrix mulitply charge coupled device previously described in U.S. Pat. Nos. 4,156,284 and 4,161,785 which are assigned to the assignee of the present invention.

Figure 1:
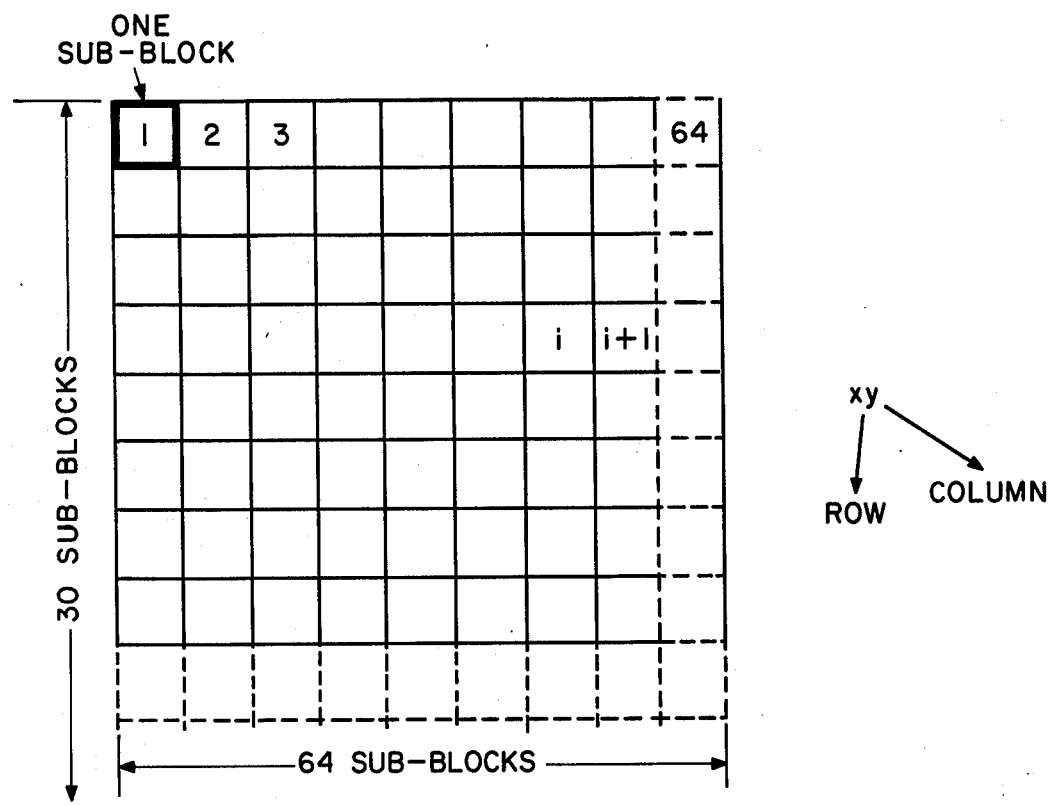
FIG. 1 illustrates a sampled image array that has been broken into $8 \times 8$ sub-blocks.
Figure 2:
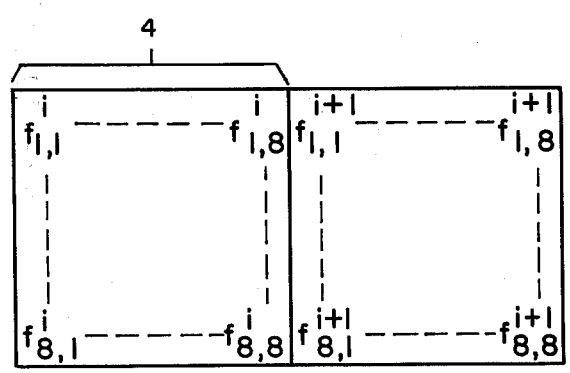
FIG. 2 illustrates how the data samples are organized within two adjacent two-dimensional sub-blocks.
Figure 3:
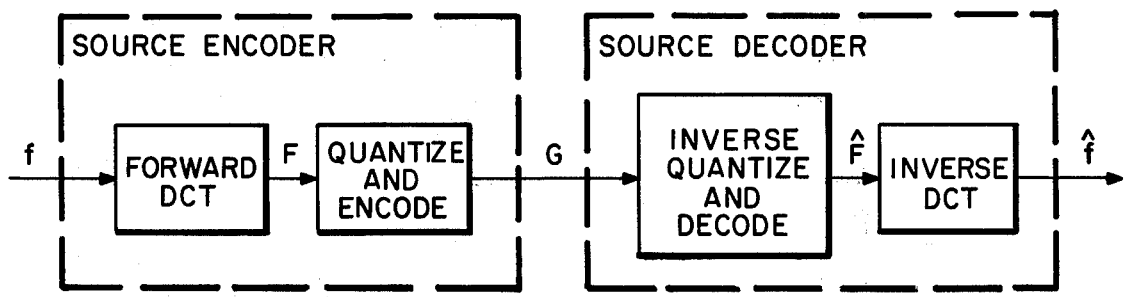
FIG. 3 is a functional block diagram of a video data link system which could employ a processor constructed according to the instant invention.

The video samples were originally taken from an image array consisting of a plurality of sub-blocks as shown in FIG. 1. It is assumed that each sub-block (e.g., 4 in FIG. 2) consists of a two-dimensional area 4 containing 64 individual pixel values $f_{xy}{}^i$. Each sub-block will be referred to as an $8 \times 8$ sub-block. The transform processor in the source encoder of FIG. 3 is designed to do a two-dimensional transform on each $8 \times 8$ sub-block of pixel values within each video field of the frame. As shown in FIG. 1 it will be assumed that there are a total of 64 $8 \times 8$ sub-blocks across eight horizontal lines and that there are 30 active $8 \times 8$ sub-blocks in the vertical direction contained in each field (240 lines per field). Most important, however, is to notice that since video is available in the standard TV raster format, only one row of each sub-block is available during a single line time and it takes 8 horizontal line times before the complete $8 \times 8$ array of pixel values is available.

The source encoder illustrated in FIG. 3 is responsible for removing the spatial redundancy in the image. It consists of a two-dimensional transform processor (referred to as a forward DCT or forward discrete cosine transform), quantizer, timing and control circuits, and digital data formatting hardware. A two-dimensional cosine transform is applied to each sub-block compacting the energy into the low frequency components. A variable bit assignment technique is implemented which assigns a fixed number of digital bits, typically 64 bits, to characterize the 64 transform coefficients with more bits assigned to the lower coefficients and less to the higher frequency coefficients. Thus, the image is characterized, on the average, by one bit per pixel for a 6:1 spacial compression. Temporal redundancy is removed by transmitting only selected frames. Typically every 4th, 8th, or 16th frame is transform encoded, stored and transmitted slowly over the subsequent 4, 8, or 16 frame respectively.

Once the transmitted data has been received the source decoder performs the inverse transform processing in such a manner as to keep the display refreshed at approximately 30 frames/sec. The purpose of the source decoder is to reconstruct an accurate approximation of the original image. The subject matter of this invention is confined to a novel approach for the two-dimensional inverse transform processor utilized in the source decoder.

Figure 4:
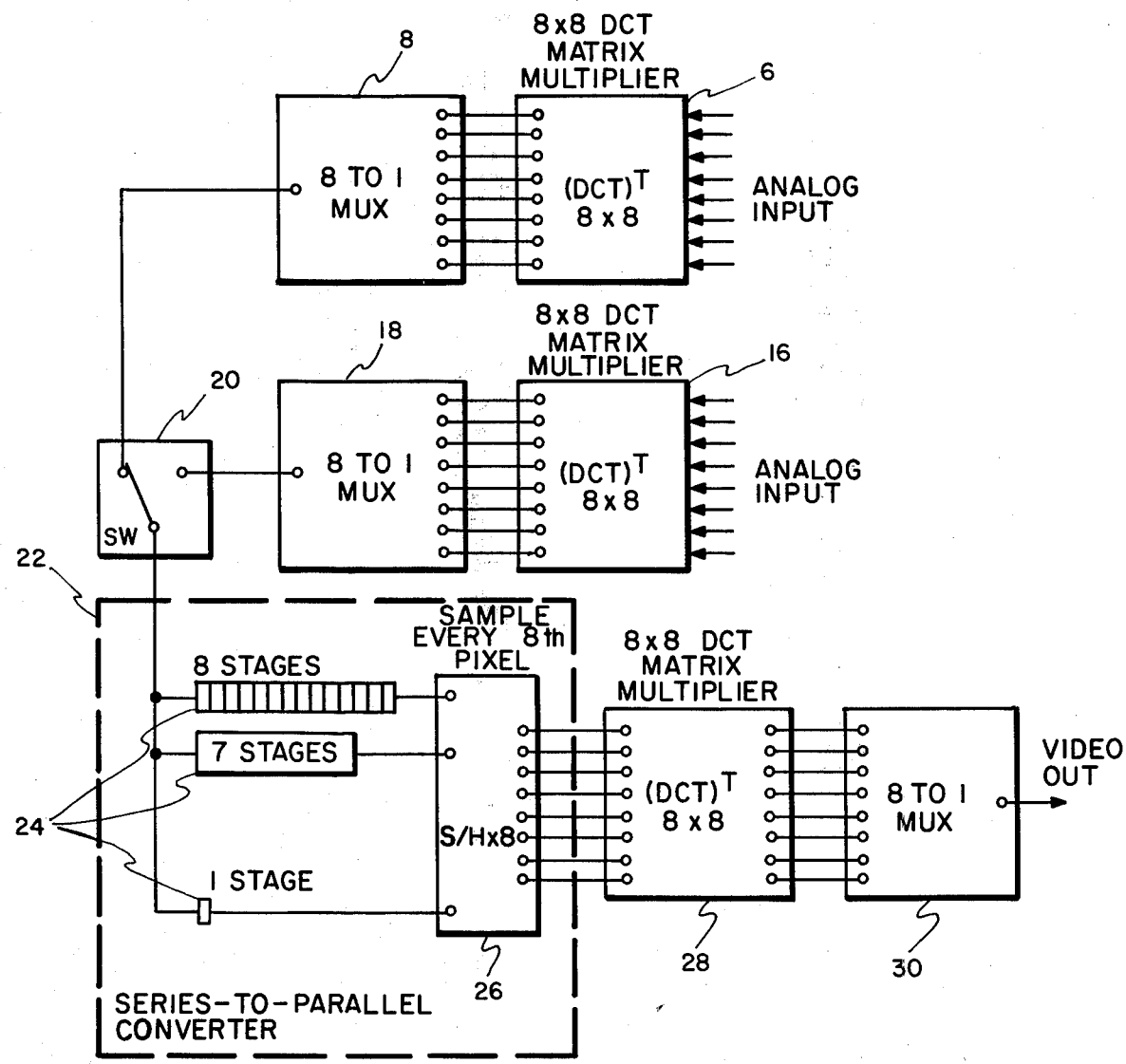
FIG. 4 represents the architecture of a two-dimensional inverse transform processor constructed according to the instant invention.

The inverse two-dimensional transform processor shown in FIG. 4 uses two matrix multiplier means (or chips) 6 and 16, at the input, two 8 to 1 analog multiplexers 8 and 18, a switching means 20, a series-to-parallel converter (or transpose) means 22, another matrix multiplier means (or chip) 28, and an 8 to 1 analog multiplexer (mux) 30.

$\hat{F}$ in FIG. 3 is an estimate of F, the original matrix of discrete cosine transform coefficients of a sub-block. After inverse quantization, the best estimate, $\hat{f}$, of the original pixel sub-block, f, is found by calculating the inverse discrete cosine transform. That is, $$\hat{f} = T^{-1} \hat{F} T. \tag{1}$$

Since for the Discrete Cosine Transform $$T^{-1} = T^T \text{ (orthogonality principle)}, \tag{2}$$

then $$\hat{f} = T^T \hat{F} T. \tag{3}$$

In matrix notation this can be written as $$\begin{bmatrix} \hat{f}_{11} \cdots \hat{f}_{18} \\ \vdots \quad \vdots \\ \hat{f}_{81} \cdots \hat{f}_{88} \end{bmatrix} = \begin{bmatrix} T_{11} \cdots T_{81} \\ \vdots \quad \vdots \\ T_{18} \cdots T_{88} \end{bmatrix} \begin{bmatrix} \hat{F}_{00} \cdots \hat{F}_{07} \\ \vdots \quad \vdots \\ \hat{F}_{70} \cdots \hat{F}_{77} \end{bmatrix} \begin{bmatrix} T_{11} \cdots T_{18} \\ \vdots \quad \vdots \\ T_{81} \cdots T_{88} \end{bmatrix}. \tag{4}$$

where
$\hat{f}$=an array of N×N reconstructed video samples over the spatial coordinates x and y
T=N×N array of fixed weights (cosine transform kernel)
$\hat{F}$=N×N two-dimensional transform coefficients of the estimate of the original pixel array, f(x,y), after inverse quantization
N=8

Since the calculations required by matrix Equation (4) are basically the same as those required by the forward transform, there is no doubt that a straightforward implementation of Equation (4) using the matrix multiplier chip is possible. However, a direct implementation of (4) results in the calculation of the complete matrix $\hat{f}$, that is, of all the reconstructed pixel values for the sub-block. Since only eight of the 64 pixel values are displayed, calculation of the entire matrix is not necessary.

Described below is a mathematical development directed at simplifying the inverse transform processor organization by calculating only the 8 pixel values of interest. That is, when row 1 of all the 8×8 sub-blocks across the image is to be displayed, only values $\hat{f}_{11}$, $\hat{f}_{12}$, $\hat{f}_{13}$ ... $\hat{f}_{18}$, the 1st row of reconstructed pixel values in Equation (4) are calculated. Similarly, when row 2 of all the 8×8 sub-blocks across the image is to be displayed, only the values $\hat{f}_{21}$, $\hat{f}_{22}$ ... $\hat{f}_{28}$, are calculated, and so on.

Referring to Equation (4), since all 64 values of $\hat{F}$ for any given sub-block are known at the decoder, the product of $T^T \hat{F}$ can be found directly. That is, the 1st column of $\hat{F}$ would be the input to a matrix multiplier having tap weights that are $T^T$.

$$\begin{bmatrix} T_{11} \cdots T_{81} \\ \vdots \quad \vdots \\ T_{18} \cdots T_{88} \end{bmatrix} \times \begin{bmatrix} \hat{F}_{00} \\ \hat{F}_{10} \\ \hat{F}_{20} \\ \vdots \\ \hat{F}_{70} \end{bmatrix} = \begin{bmatrix} I_{11} \\ I_{21} \\ I_{31} \\ \vdots \\ I_{81} \end{bmatrix}. \tag{5}$$

The resultant product is a column vector (see Equation (5)) which represents the 1st column of an intermediate resultant matrix I. Consecutive transforms of columns 2 through 8 of $\hat{F}$ result in the calculation of the complete matrix.

Then, after all the columns of F have been transformed, $$\hat{f} = \begin{bmatrix} I_{11} \cdots I_{18} \\ \vdots \quad \vdots \\ I_{81} \cdots I_{88} \end{bmatrix} \times \begin{bmatrix} T_{11} \cdots T_{18} \\ \vdots \quad \vdots \\ T_{81} \cdots T_{88} \end{bmatrix}. \tag{6}$$

For matrix multiplier chip implementation of Equation (6), it is necessary to calculate $\hat{f}^T$ so that a fixed set of weights can be post multiplied by a variable input vector. That is, $$\hat{f}^T = T^T I^T \tag{7}$$

or $$\begin{bmatrix} \hat{f}_{11} \cdots \hat{f}_{81} \\ \vdots \quad \vdots \\ \hat{f}_{18} \cdots \hat{f}_{88} \end{bmatrix} = \begin{bmatrix} T_{11} \cdots T_{81} \\ \vdots \quad \vdots \\ T_{18} \cdots T_{88} \end{bmatrix} \begin{bmatrix} I_{11} \cdots I_{81} \\ \vdots \quad \vdots \\ I_{18} \cdots I_{88} \end{bmatrix}.$$

Referring to Equation (7), notice that only column 1 of $\hat{f}^T$ need be calculated to give the desired 1st row of reconstructed pixel values. Thus, all that is required on the right hand side of equation (7) is that column 1 of the $I^T$ matrix be available for input to a matrix multiply chip with weights $T^T$. Unfortunately, row 1 of I is available after the 1st input to the matrix multiplier chip (see Equation (5)). Notice, however, that the consecutive outputs of the 1st parallel line out of the first two matrix multiplier means and switch 20 are $I_{11}, I_{12}, \ldots I_{18}$ (see FIG. 5). The series-to-parallel converter described herein can be used to reformat the serial sample stream to give a parallel input to the second matrix multiplier chip. The parallel outputs are $\hat{f}_{11}, \hat{f}_{12}, \ldots \hat{f}_{18}$ which, after 8 to 1 multiplexing are sent to the display. When line 2 is to be processed $\hat{f}_{21}, \hat{f}_{22} \ldots \hat{f}_{28}$ the same calculations are done except that the second output line of the first matrix multiplier chip is input to the series-to-parallel chip, and so on for the other lines.

Two matrix multipliers 6 and 16 are needed at the input of the inverse two-dimensional cosine transform processor shown in FIG. 4 to reduce the required operating speed to less than 8 MHz. At the present time the matrix multiplier chip has an upper operating frequency of 8 MHz. If the matrix multiplier were capable of operating at a frequency greater than 9.702 MHz, then only one matrix multiplier would be required in the first level matrix transform instead of the two matrix multipliers 6 and 16 and switch 20. Each matrix multiplier calculates the inverse discrete cosine transform at a rate of 4.851 MHz. The two 8 to 1 multiplexers 8 and 18 have eight inputs and one output. The commutation rate is only 15.75 KHz, or one change per line. The two position switch 20 changes position at a rate of 9.702 MHz. This will provide a serial analog input to the series to parallel converter 22 at a rate of 9.702 MHz. The input shift registers 24 will be clocked at this rate and the sample and hold circuits 26 (denoted by S/H) will be enabled at a rate of 1.21275 MHz. The second level matrix multiplier 28 will operate at 1.21275 MHz. Finally, the 8 to 1 multiplexers 30 commutate at the pixel rate of 9.702 MHz.

The series to parallel converter 22 accepts the analog signals from the two position switch 20. Each analog signal is simultaneously clocked into a set of eight delay lines 24, each one stage shorter than the next. With each clock cycle the shift register data is advanced until at the end of eight of the 9.702 MHz clock cycles the output contains pixels 1 through 8 in the proper order. The outputs are sampled and held simultaneously by sample and hold circuits 26. The sample and hold circuits 26 are activated every eighth shift register cycle, and retain the data until the next sample period so that an eight to one speed reduction is possible for the matrix multiplier and other transform associated chips. Since the analog shift registers inherently presample the analog data, so that it is fixed over a 50 nanosecond period, the window of the sample and holds can be a reasonable 10 to 20 nanoseconds. This requirement is certainly desirable compared to a 16 picosecond window needed for a time varying 9.702 MHz signal.

Figure 5:
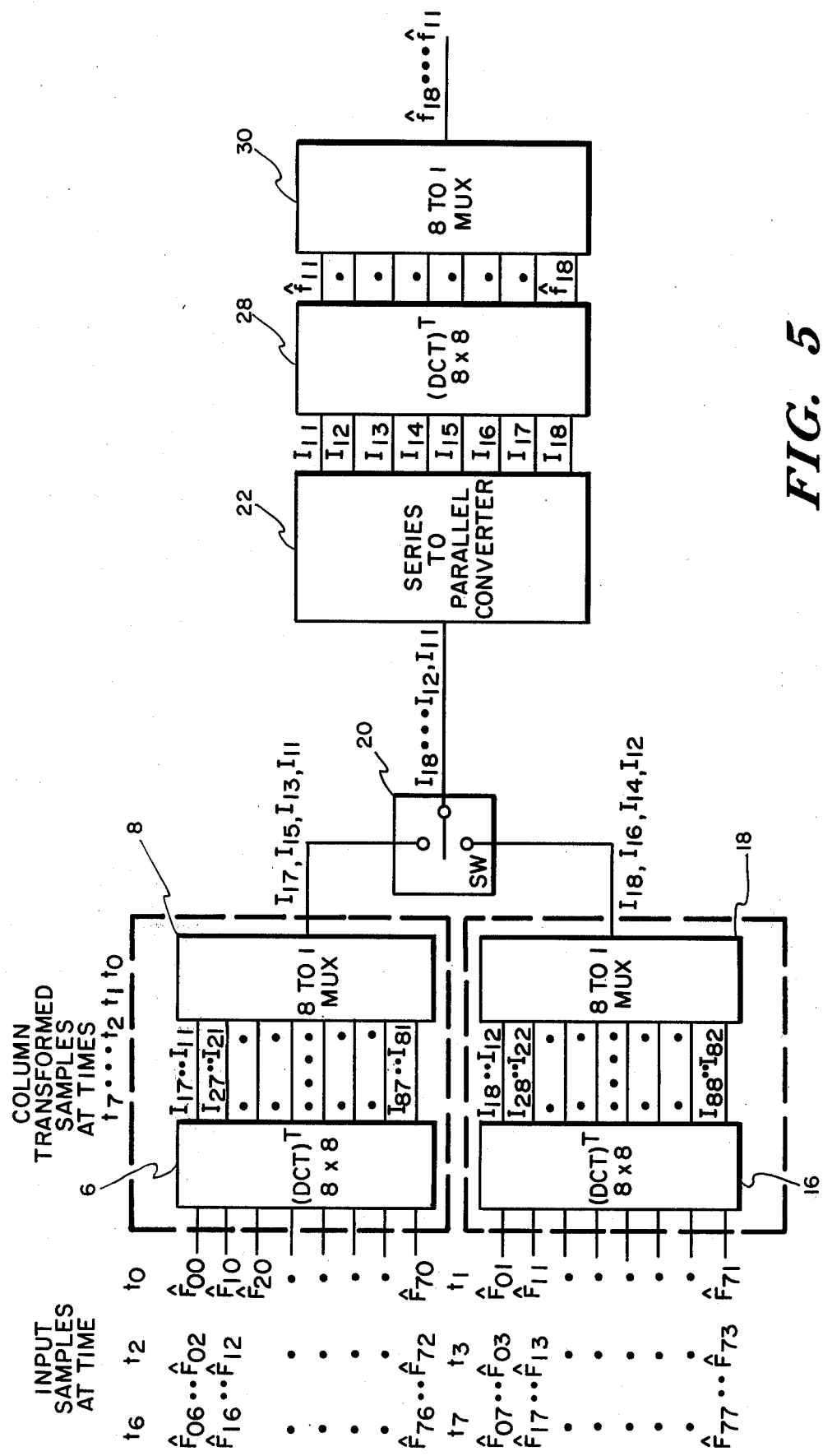
FIG. 5 illustrates the data flow in the inverse transform processor during reconstruction of row 1 pixels.

Shown in FIG. 5 is the data flow during reconstruction of the row 1 pixels. As shown, coefficients will be alternately presented to one of the two first level matrix multiplier means, each tp seconds, where tp is equal to 1/9.702 MHz.

At the time $t_0$, column 0 of the $\hat{F}$ matrix is presented to matrix multiplier means 6, at $t_1$ column 1 of the $\hat{F}$ matrix is presented to matrix multiplier 16. Alternately each subsequent column of the $\hat{F}$ matrix is presented to the matrix multipliers until column 7 is presented to matrix multiplier means 16. tp seconds later column 0 of the next 8×8 sub-block is presented to matrix multiplier means 6 and the process is continued.

Matrix multiplier 6 which has been presented with the even columns of $\hat{F}$, calculates the odd numbered columns of the I matrix according to equation 5. Accordingly matrix multiplier 16 which has been presented with the odd columns of $\hat{F}$, calculates the even numbered columns of the I matrix.

Each 8 to 1 multiplexer 8 and 18 accepts at its input, the samples located on one of the N outputs of its corresponding matrix multiplier 6 and 16 for a complete horizontal display time. If there are 64 sub-blocks and 8 horizontal samples per block, the horizontal display time is equal to 512 tp seconds.

During the first horizontal display time the output from the 8 to 1 multiplexer 8 is the sequence of coefficients $I_{11}$, $I_{13}$, $I_{15}$ and $I_{17}$. Similarly, during the first 8 tp seconds the output for the 8 to 1 multiplexer 18 is the sequence of coefficients $I_{12}$, $I_{14}$, $I_{16}$ and $I_{18}$. Switch 20 switches each tp seconds so as to resequence the elements of the I matrix in the proper order.

Series to parallel converter 22 accepts the row elements of the I matrix and converts them to a parallel order in 8 tp seconds.

Every 8 tp seconds, the second level matrix multiplier 28 performs the inverse transform operation on each row of the I matrix, a column at a time according to equation 7.

The 8:1 multiplexer 30 samples each terminal of matrix multiplier 28 every tp seconds so as to output the row elements of the $\hat{f}$ matrix in a serial order.

The matrix multiplier means can be constructed from conventional circuitry or by utilizing the described inventions in U.S. Pat. Nos. 4,156,284 and 4,161,785 assigned to the assignee of the present invention. The matrix multiplier chip is an integrated circuit capable of performing a matrix operation in the analog domain. The basis of the multiplication process is a time proven technique of multiplication by the deposition of charge on a fixed size capacitor. Integrated circuit technology has enabled the integration of many parallel multiplication circuits on a single substrate.

The matrix multiplier chip is capable of performing the multiplications and additions required to multiply an 8×8 matrix of fixed coefficients by an 8×1 vector of variable input voltages, and produce an 8×1 output vector as shown in equation 5. The matrix of fixed coefficients is implemented as an array of capacitors each of a size determined by the coefficient desired. The size of the capacitor is accurate to 0.17 percent.

Figure 6:
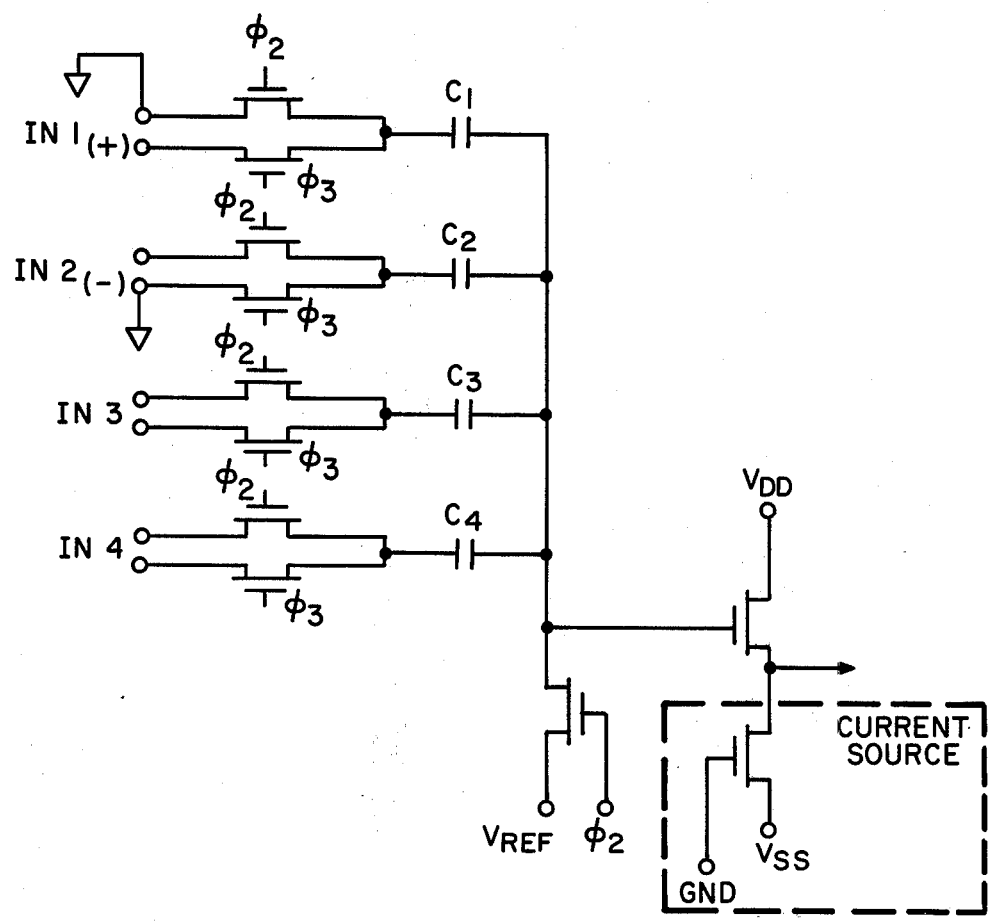
FIG. 6 is a schematic diagram of the input and output circuitry of the matrix multiplier chip.

The input and output circuitry of one of several coefficients calculated by the matrix multiplier chip is shown in FIG. 6.

Figure 7:
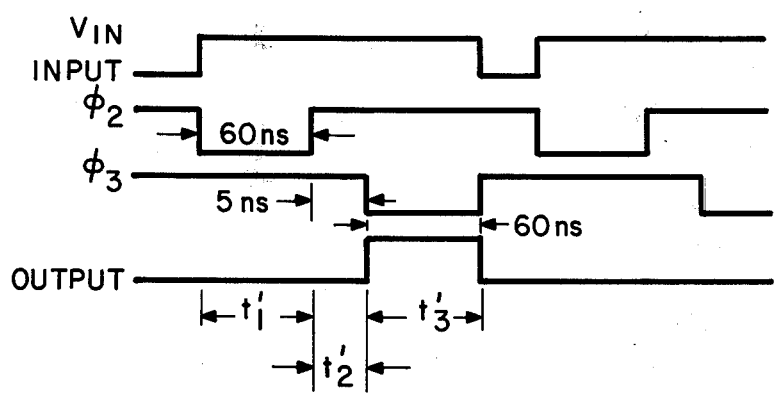
FIG. 7 illustrates some timing waveforms associated with the matrix multiplier chip.

The timing signals required to drive the matrix multiply chip are shown in FIG. 7. The indicated pulse widths are the minimum required. Thus, the maximum operating speed of the device is 8 MHz. Note that all the input voltages must be present at the matrix multiply chip inputs during times $t_1$, $t_2$ and $t_3$. Also, the output voltage is available only during time $t_3$.

The capacitors labeled c1-c4 represent the matrix weights whose sizes are determined by the user. Since capacitor size can only be positive, a special technique must be used to obtain a negative weight. As shown in FIG. 6, a positive weight is implemented by tying the FET connected to $\phi 2$ to a ground, and a negative weight is made by connecting the FET driver connected to $\phi 3$ to ground.

During time 1, all FETs connected to $\phi 2$ are allowed to conduct. All the capacitors will be charged to a specific voltage. If a positive coefficient is to be implemented, the capacitor charges to the difference between ground and the reference voltage. For negative coefficients the capacitor is charged to the difference between the analog input voltage and the reference voltage. During time 2 all FETs are nonconducting and one side of all the capacitors is allowed to float. During time 3 all FETs connected to $\phi 3$ are allowed to conduct. For the positive coefficients, the capacitor charges up to the signal voltage while the negative coefficient capacitors discharge to ground. Since one side of all the capacitors is connected to a bus, these charges cause the one side of the capacitors to change in voltage proportional to the inner product of the input voltages and the capacitor weights. The output from each bus is then passed through a source follower circuit. This output voltage is a change from a reference voltage (determined by VREF) and may be either a positive or a negative change.

What is claimed as new and desired to be secured by Letters Patent of the Unites States is:

1. An inverse two-dimensional transform processor sampling N samples of source data within an N×N sub-block of data received at a source decoder comprising:

a plurality of matrix multiplier means accepting said source data, each of said matrix multiplier means calculating N one-dimensional transformed data samples, each of said matrix multiplier means having N input terminals and N output terminals;

a plurality of N to 1 multiplexers, each having N input terminals and 1 output terminal, each of said multiplexers being connected to one of said matrix multiplier means so that each output terminal of one of said matrix multiplier means is connected to one of said N input terminals of one of said multiplexers;

a switching means accepting sequential samples from each of said N to 1 multiplexers and ordering them so that they are in a serial order;

a series to parallel data converter means accepting said serial samples in a serial order from said switching means and transforming the order of said samples into a parallel order;

a second matrix multiplier means accepting N samples in a parallel order from said series to parallel data converter and yielding N one-dimensional transformed coefficients; and a second N to 1 multiplexer, each input terminal of said second N to 1 multiplexer being connected to one of N output terminals of said second matrix multiplier means in order to yield said transformed coefficients from said second matrix multiplier in a serial order.

2. The inverse two-dimensional transform processor as set forth in claim 1 wherein said series to parallel data converter means further comprises:

an input line which receives a sample from said switching means every tp seconds; and a set of N analog delay lines, each said delay line having an input end connected to said input line and an output end, each of said delay lines being one stage shorter than the next, with the longest delay line being N stages long so that at the end of Ntp seconds, N analog signals which had been in a serial order on said input line are in a parallel order at the outputs of said N analog delay lines.

3. An inverse two-dimensional transform processor sampling N samples of source data within an N×N sub-block of data received at a source decoder comprising:

a first matrix multiplier means accepting said source data and calculating N one-dimensional transformed data samples, said first matrix multiplier means having N input terminals and N output terminals;

a first N to 1 multiplexer, each input terminal of said multiplexer being connected to each of the N output terminals of said first matrix multiplier means;

a series to parallel data converter means accepting samples in a serial order from said first N to 1 multiplexer and transforming the order of said samples into a parallel order;

a second matrix multiplier means accepting N samples in a parallel order from said series to parallel data converter and yielding N transformed coefficients; and a second N to 1 multiplexer, each input terminal of said second N to 1 multiplexer being connected to one of the N output terminals of said second matrix multiplier means in order to yield said transformed coefficients from said second matrix multiplier in a serial order.

4. The inverse two-dimensional transform processor as set forth in claim 3 wherein said series to parallel data converter means further comprises:

an input line which receives a sample from said first N to 1 multiplexer every tp seconds; and a set of N analog delay lines, each said delay line having an input end connected to said input line and an output end, each of said delay lines being one stage shorter than the next, with the longest delay line being N stages long so that at the end of Ntp seconds, N analog signals which had been in a serial order on said input line are in a parallel order at the outputs of said N analog delay lines.

* * * * *